Feb. 9, 1943.   A. WARMISHAM   2,310,502
OPTICAL OBJECTIVE
Filed July 9, 1941

INVENTOR
A. WARMISHAM
BY Blair + Kilcoyne
ATTORNEYS

Patented Feb. 9, 1943

2,310,502

UNITED STATES PATENT OFFICE 2,310,502

OPTICAL OBJECTIVE

Arthur Warmisham, Leicester, England, assignor to Taylor, Taylor & Hobson Limited, Leicester, England, a company of Great Britain Application July 9, 1941, Serial No. 401,648
In Great Britain July 12, 1940

12 Claims. (Cl. 88—57)

This invention relates to an optical objective for photographic and like purposes, corrected for spherical aberration, coma, astigmatism and distortion, of the kind comprising an asymmetrical divergent component disposed behind two convergent components and in front of a third convergent component, each of the components consisting of a simple element. It should be made clear that the side of the longer conjugate is herein referred to as the "front" of the objective in accordance with the usual convention.

In one known objective of the above kind, glass having a mean refractive index $n_D$ substantially greater than 1.65 is employed for the divergent component, which is double-concave, and the radius of curvature of the front surface of such component is at least ten times that of the rear surface thereof, the glass used for the rear component preferably having a mean refractive index $n_D$ greater than 1.62 and an Abbé $\nu$ number less than 50. Such objective was primarily intended for very short focal lengths, such as 12½ millimetres, and it has been found that, if the objective is employed for longer focal lengths, such as 2½ inches, it is not wholly satisfactory in respect of zonal spherical aberration.

The present invention has for its primary object to effect improvements in an objective of the above-mentioned kind, whereby the aberrations are satisfactorily corrected over a semi-field of at least 10 degrees.

To this end according to the invention the rear surface of the second convergent component is convex towards the front and has a radius of curvature less than five times the equivalent focal length of the objective whilst the front surface of the divergent component has a radius of curvature greater than ten times the equivalent focal length, whether such surface be convex or concave to the front. The radius of curvature of the rear surface of the second convergent component is preferably greater than the equivalent focal length, and that of the rear surface of the divergent component is preferably less than one-tenth of that of the front surface of the divergent component. As is the known objective above mentioned, the mean refractive index of the glass used for the divergent component is preferably greater than 1.65, and the glass used for the rear convergent component preferably has a mean refractive index greater than 1.62 and an Abbé $\nu$ number less than 50.

Figure 1:
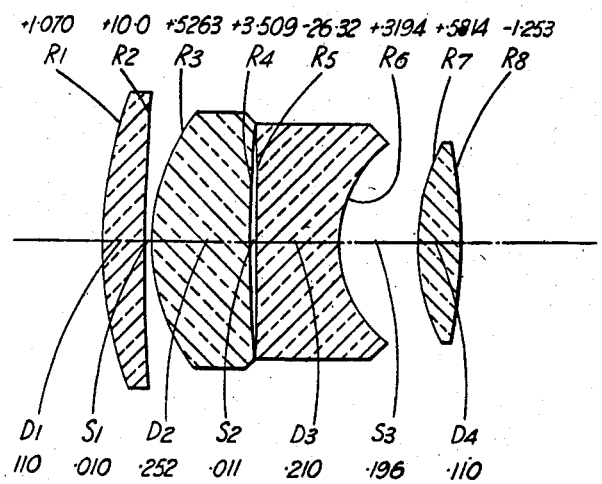
Figure 2:
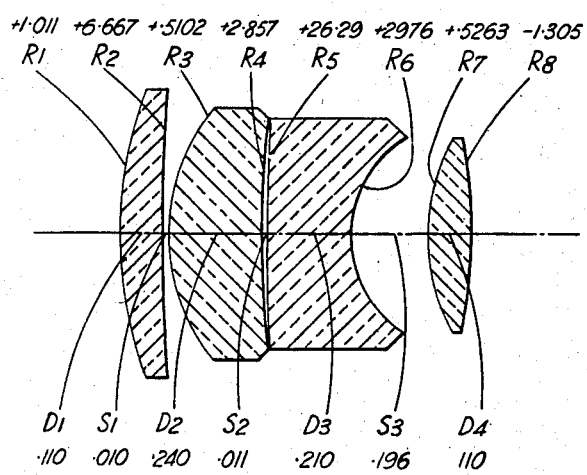

In the accompanying drawing:

Figures 1 and 2 respectively illustrate two convenient practical examples of objective according to the invention.

Numerical data for these two examples are given in the tables below, in which $R_1$, $R_2$ ... designate the successive radii of curvature of the surfaces counting from the front (the positive sign indicating that the surface is convex towards the front and the negative that it is concave thereto), $D_1$, $D_2$ ... designate the axial thicknesses of the lens elements, and $S_1$, $S_2$, $S_3$ the axial air separations between the components. The glass of which each element is made is defined in terms of its mean refractive index $n_D$ and its Abbé $\nu$ number.

Example I

| Equivalent focal length 1.000 | | Relative aperture F/1.4 | |
|---|---|---|---|
| Radius | Thickness or separation | Refractive index $n_D$ | Abbé $\nu$ number |
| $R_1$+1.070 | $D_1$ .110 | 1.613 | 59.4 |
| $R_2$+10.0 | $S_1$ .010 | | |
| $R_3$+.5263 | $D_2$ .252 | 1.613 | 59.4 |
| $R_4$+3.509 | $S_2$ .011 | | |
| $R_5$—26.32 | $D_3$ .210 | 1.749 | 27.8 |
| $R_6$+.3194 | $S_3$ .196 | | |
| $R_7$+.5814 | $D_4$ .110 | 1.644 | 48.3 |
| $R_8$—1.253 | | | |

It will be noticed that in this example the radius $R_4$ is approximately 3½ times the equivalent focal length, the surface being convex to the front, whilst the fifth surface is concave to the front and has a radius over 26 times the equivalent focal length. With this example, at a focal length of 2½ inches, the residual aberrations are very satisfactory over a semi-field of 12 degrees.

Example II

| Equivalent focal length 1.000 | | Relative aperture F/1.4 | |
|---|---|---|---|
| Radius | Thickness or separation | Refractive index $n_D$ | Abbé $\nu$ number |
| $R_1$+1.011 | $D_1$ .110 | 1.613 | 59.4 |
| $R_2$+6.667 | $S_1$ .010 | | |
| $R_3$+.5102 | $D_2$ .240 | 1.613 | 59.4 |
| $R_4$+2.857 | $S_2$ .011 | | |
| $R_5$+26.29 | $D_3$ .210 | 1.749 | 27.8 |
| $R_6$+.2976 | $S_3$ .196 | | |
| $R_7$+.5263 | $D_4$ .110 | 1.644 | 48.3 |
| $R_8$—1.305 | | | |

This example differs from the first primarily in that the fifth surface is slightly convex towards the front and the convexity of the fourth surface to the front is somewhat reduced. As in the first example, the radius of the fifth surface is substantially greater than ten times the equivalent focal length.

What I claim as my invention and desire to secure by Letters Patent is:

1. An optical objective corrected for spherical aberration, coma, astigmatism and distortion, comprising four axially aligned simple components of which the two front components and the rear component are convergent, whilst the third is divergent and has the radius of curvature of its front surface numerically greater than ten times the equivalent focal length of the objective, the rear surface of the second convergent component being convex towards the front and having a radius of curvature less than five times the equivalent focal length of the objective.

2. An optical objective as claimed in claim 1, in which the radius of curvature of the rear surface of the second convergent component is greater than the equivalent focal length of the objective.

3. An optical objective as claimed in claim 1 in which the radius of curvature of the rear surface of the divergent component is less than one-tenth of that of the front surface thereof.

4. An optical objective corrected for spherical aberration, coma, astigmatism and distortion, comprising four axially aligned simple components of which the two front components and the rear component are convergent, whilst the third is divergent and has the radius of curvature of its front surface numerically greater than ten times the equivalent focal length of the objective and numerically greater than ten times that of the front surface of the same component, the rear surface of the second convergent component being convex towards the front and having a radius of curvature greater than the equivalent focal length of the objective but less than five times such equivalent focal length.

5. An optical objective as claimed in claim 1, in which the mean refractive index of the glass used for the divergent component is greater than 1.65.

6. An optical objective as claimed in claim 4, in which the mean refractive index of the glass used for the divergent component is greater than 1.65.

7. An optical objective as claimed in claim 1, in which the glass used for the divergent component has a mean refractive index greater than 1.65 and that used for the rear component has a mean refractive index greater than 1.62 and an Abbé $\nu$ number less than 50.

8. An optical objective as claimed in claim 1, in which the front surface of the divergent component is convex towards the front.

9. An optical objective as claimed in claim 4, in which the front surface of the divergent component is convex towards the front.

10. An optical objective corrected for spherical aberration, coma, astigmatism and distortion, comprising four axially aligned simple components of which the two front components and the rear component are convergent, whilst the third is divergent and is made of glass having a mean refractive index greater than 1.65, its front surface being convex towards the front and having a radius of curvature greater than ten times the equivalent focal length of the objective, the rear surface of the second component being convex towards the front and having a radius of curvature between 1 and 5 times the equivalent focal length of the objective, whilst the glass used for the rear component has a mean refractive index greater than 1.62 and an Abbé $\nu$ number less than 50.

11. An optical objective corrected for spherical aberration, coma, astigmatism and distortion, comprising four axially aligned simple components and having numerical data substantially as set forth in the following table:

| Equivalent focal length 1.000 | | Relative aperture F/1.4 | |
|---|---|---|---|
| Radius | Thickness or separation | Refractive index $n_D$ | Abbé $\nu$ number |
| $R_1 + 1.070$ | $D_1$ .110 | 1.613 | 59.4 |
| $R_2 + 10.0$ | $S_1$ .010 | | |
| $R_3 + .5263$ | $D_2$ .252 | 1.613 | 59.4 |
| $R_4 + 3.509$ | $S_2$ .011 | | |
| $R_5 - 26.32$ | $D_3$ .210 | 1.749 | 27.8 |
| $R_6 + .3194$ | $S_3$ .196 | | |
| $R_7 + .5814$ | $D_4$ .110 | 1.644 | 48.3 |
| $R_8 - 1.253$ | | | |

12. An optical objective corrected for spherical aberration, coma, astigmatism and distortion, comprising four axially aligned simple components and having numerical data substantially as set forth in the following table:

| Equivalent focal length 1.000 | | Relative aperture F/1.4 | |
|---|---|---|---|
| Radius | Thickness or separation | Refractive index $n_D$ | Abbé $\nu$ number |
| $R_1 + 1.011$ | $D_1$ .110 | 1.613 | 59.4 |
| $R_2 + 6.667$ | $S_1$ .010 | | |
| $R_3 + .5102$ | $D_2$ .240 | 1.613 | 59.4 |
| $R_4 + 2.857$ | $S_2$ .011 | | |
| $R_5 + 26.29$ | $D_3$ .210 | 1.749 | 27.8 |
| $R_6 + .2976$ | $S_3$ .196 | | |
| $R_7 + .5263$ | $D_4$ .110 | 1.644 | 48.3 |
| $R_8 - 1.305$ | | | | wherein $R_1 R_2 \ldots$ designate the radii of curvature of the individual lens surfaces, $D_1 D_2 \ldots$ the axial thicknesses of the lens elements and $S_1 S_2 S_3$ the axial air spaces between the components.

ARTHUR WARMISHAM.